(12) United States Patent
Ichikawa et al.

(10) Patent No.: US 9,223,396 B2
(45) Date of Patent: Dec. 29, 2015

(54) INFORMATION PROCESSING APPARATUS AND COMPUTER READABLE MEDIUM

(71) Applicant: CASIO COMPUTER CO., LTD., Shibuya-ku, Tokyo (JP)

(72) Inventors: Tatsuzi Ichikawa, Saitama (JP); Koji Nishitani, Tokyo (JP); Fuminori Sano, Tokyo (JP); Noriyoshi Katsumura, Saitama (JP); Kazuyasu Yamane, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 205 days.

(21) Appl. No.: 13/938,457

(22) Filed: Jul. 10, 2013

(65) Prior Publication Data

US 2014/0028860 A1    Jan. 30, 2014

(30) Foreign Application Priority Data

Jul. 24, 2012   (JP) .................................. 2012-163517
Jul. 26, 2012   (JP) .................................. 2012-165317

(51) Int. Cl.
| | | |
|---|---|---|
| *H04N 1/04* | (2006.01) | |
| *G06F 3/00* | (2006.01) | |
| *H04N 5/232* | (2006.01) | |
| *H04N 5/445* | (2011.01) | |
| *H04N 5/77* | (2006.01) | |
| *H04N 5/225* | (2006.01) | |

(52) U.S. Cl.
CPC .............. *G06F 3/005* (2013.01); *H04N 5/2251* (2013.01); *H04N 5/232* (2013.01); *H04N 5/44543* (2013.01); *H04N 5/772* (2013.01); *H04N 2201/0434* (2013.01)

(58) Field of Classification Search
CPC ... H04N 5/232; H04N 5/44543; H04N 5/772; H04N 5/2251; H04N 2201/0434
USPC .................................. 358/1.9, 1.13, 1.15, 474
See application file for complete search history.

(56) References Cited

U.S. PATENT DOCUMENTS

2013/0005405 A1*   1/2013   Prociw .......................... 455/566

FOREIGN PATENT DOCUMENTS

| JP | 2008-097188 | 4/2008 |
|---|---|---|
| JP | 2010-176603 | 8/2010 |

OTHER PUBLICATIONS

Japanese Office Action for Japanese Patent Application No. 2012-165317 mailed Aug. 25, 2015.

* cited by examiner

*Primary Examiner* — Houshang Safaipour
(74) *Attorney, Agent, or Firm* — Amin, Turocy & Watson, LLP

(57) ABSTRACT

An information processing apparatus includes a display unit, an image pickup unit, a photography control unit and a storage control unit. The display unit displays a first image thereon. The image pickup unit photographs a recording medium to generate a second image. The photography control unit makes the image pickup unit photograph the recording medium at a predetermined timing. The storage control unit links and stores in a storage unit the second image generated by the image pickup unit with the first image displayed on the display unit at the predetermined timing.

10 Claims, 16 Drawing Sheets

FIG. 12A

|  | APRIL, 2012 | | | | | |
|---|---|---|---|---|---|---|
| SUN. | MON. | TUES. | WED. | THUR. | FRI. | SAT. |
| 1 ☐ BASEBALL | 2 | 3 | 4 | 5 | 6 | 7 |
| 8 | 9 | 10 ☐ TANAKA CO, LTD | 11 ☐ DISCUSSION ☐ MEETING | 12 | 13 | 14 ☐ MT. OTAKE |
| 15 | 16 | 17 | 18 ☐ BUSINESS TRIP | 19 | 20 ☐ DISCUSSION | 21 |
| 22 | 23 ☐ DISCUSSION WITH MR.YAMADA | 24 | 25 | 26 ☐ A PROJECT | 27 | 28 |
| 29 | 30 | 1 | 2 | 3 | 4 | 5 |
| 6 | 7 | 8 | 9 | 10 | 11 | 12 |

✓ COMPLETE    ✗ CANCEL

☐  DISCUSSION ON XY1 SALES PROMOTION TOOL

| START | 2012/04/20(FRI.)  10:30 | ADD ATTENDEE | |
| END | 2012/04/20(FRI.)  12:00 | ATTENDEE | ☐ TARO YAMADA ☐ △△△△ ☐ ××××|
| TIME ZONE | (GMT+9:00)TOKYO, OSAKA | | |
| ALL DAY | ☐ | | |
| WHERE | HEAD OFFICE 15C | HANDWRITTEN NOTE |  412i |
| CONTENT | XY1 | | |
| REPEAT | NO REPEAT | | |
| REMINDER | 10 min. ⊖ ⊕ | | |
| DISPLAY FOR PUBLIC | HAVE PLAN | | |
| PRIVACY OPTION | DEFAULT | | |

52

FIG. 13

| ID | EVENT NAME | DATE AND TIME | | ATTENDEE | ...... |
| --- | --- | --- | --- | --- | --- |
| | | START | END | | |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |

FIG. 14

| ID | IMAGE NAME | LINKING DATE AND TIME | INDEX |
| --- | --- | --- | --- |
| ...... | ...... | ...... | ...... |
| ...... | ...... | ...... | ...... |
| ...... | ...... | ...... | ...... |
| ...... | ...... | ...... | ...... |

INFORMATION PROCESSING APPARATUS AND COMPUTER READABLE MEDIUM

CROSS REFERENCE TO RELATED APPLICATION

This application is based upon and claims the benefit of priority under 35 USC 119 of Japanese Patent Applications No. 2012-163517 filed on Jul. 24, 2012 and No. 2012-165317 filed on Jul. 26, 2012, the entire disclosure of which, including the descriptions, claims, drawings, and abstracts, is incorporated herein by reference in its entirety.

BACKGROUND OF THE INVENTION

1. Field of the Invention

The present invention relates to an information processing apparatus and a computer readable medium.

2. Background Art

These days, at a meeting or a presentation, explanation is often made with a material displayed on a PC (Personal Computer) or a tablet-type terminal. In such a situation, an attendee takes a note on a notebook, for example, about the point of the explanation or his/her comments on the explanation while seeing the displayed material. The material may be provided as an electronic file. However, the attendee may forget a correspondence between pages of the material and handwritten notes.

Then, there has been proposed, for example, in Japanese Patent Application Laid-Open Publication No. 2010-176603, a meeting material search support apparatus to, in response to a slide of a material being switched to another thereof displayed at a meeting, extract a difference between a picked-up image of a note picked up at a display starting time of the slide and a picked-up image of the note picked up at the display switching time of the slide to another, generate deference information including region image data of the difference and the picked-up image picked up at the display switching time and link and register a slide ID with the difference information, the apparatus being used in a meeting room where a camera to photograph a notebook of an attendee is installed. Accordingly, a meeting material displayed at the time when a note is written on a notebook can be found.

However, in this conventional technology, a large scale system including a computer apparatus used for a meeting or the like, a display board to display a meeting material and a camera to photograph a notebook is needed. Also, a process to identify a meeting material is complicated; for example, in order to find a meeting material displayed at the time when a note is written on a notebook, it is necessary that the note is photographed with a camera, and the picked-up image is collated with the region image data included in the difference information.

SUMMARY OF THE INVENTION

Objects of the present invention include making it easy to refer to a correspondence between contents recorded on a recording medium and contents displayed on a display unit.

According to a first aspect of the present invention, there is provided an information processing apparatus including: a display unit which displays a first image; an image pickup unit which photographs a recording medium to generate a second image; a photography control unit which makes the image pickup unit photograph the recording medium at a predetermined timing; and a storage control unit which links and stores in a storage unit the second image generated by the image pickup unit with the first image displayed on the display unit at the predetermined timing.

According to a second aspect of the present invention, there is provided a non-transitory computer readable medium in which a program to make a computer perform a procedure is stored, the procedure including: displaying a first image on a display unit; making an image pickup unit photograph a recording medium to generate a second image at a predetermined timing; and linking and storing in a storage unit the second image generated by the image pickup unit with the first image displayed on the display unit at the predetermined timing.

According to a third aspect of the present invention, there is provided an information processing apparatus including: an image pickup unit which photographs a recording medium to obtain image data; a management unit which performs schedule management by registering event information including a date and time relevant to an event; an obtaining unit which obtains a linking date and time to link the image data with the event information registered in the management unit; and a storage control unit which links and stores in a storage unit the image data with the event information including the date and time corresponding to the linking date and time obtained by the obtaining unit.

According to a fourth aspect of the present invention, there is provided a non-transitory computer readable medium in which a program to make a computer perform a procedure is stored, the procedure including: photographing a recording medium to obtain image data; performing schedule management by registering event information including a date and time relevant to an event; obtaining a linking date and time to link the image data with the event information; and linking and storing in a storage unit the image data with the event information including the date and time corresponding to the obtained linking date and time.

BRIEF DESCRIPTION OF THE DRAWINGS

FIGS. 12A and 12B each show a scheduler display screen of an information processing apparatus in accordance with a fourth embodiment of the present invention, wherein FIG. 12A shows a calendar display screen, and FIG. 22B shows an event (schedule) display screen.

FIG. 13 shows, in a scheduler, the data structure stored in a storage unit.

FIG. 14 shows the data structure of note images managed through an image management program.

FIGS. 17A and 17B each show a handwritten note image display screen displayed through an image management program, wherein FIG. 17A shows a note image list display screen, and FIG. 17B shows a note image one page display screen.

DETAILED DESCRIPTION OF THE PREFERRED EMBODIMENTS

First Embodiment

First, an information processing apparatus in accordance with a first embodiment of the present invention is described with reference to FIGS. 1 to 7.

Note that the present invention is not limited to the illustrated embodiments described hereinafter.

Figure 1:
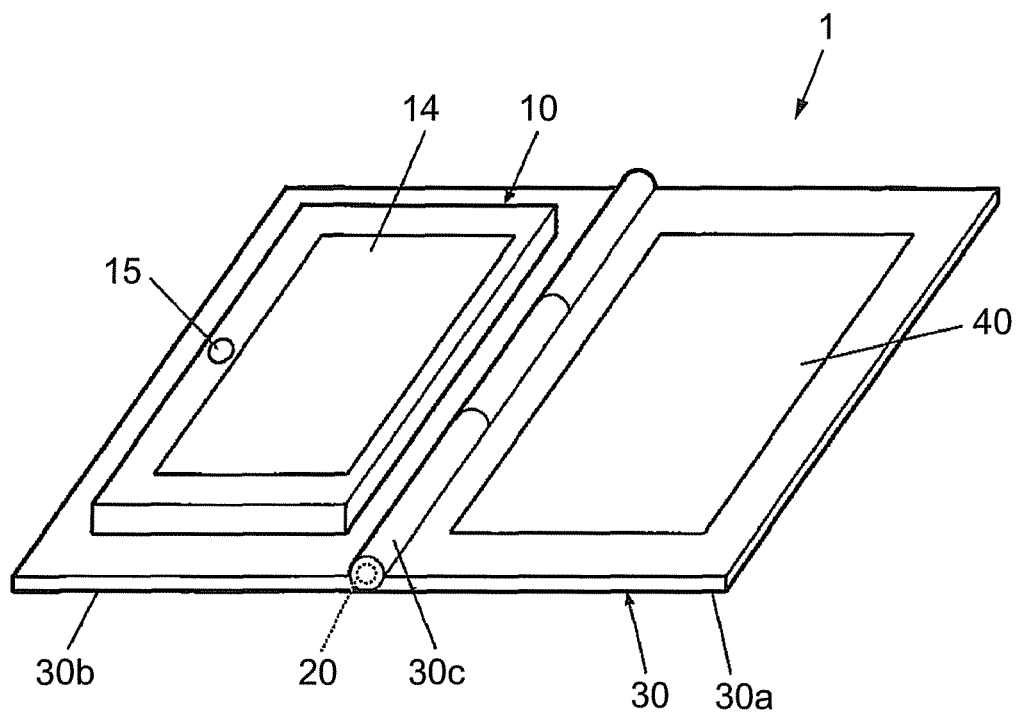
FIG. 1 is a perspective view showing the external appearance of an information processing apparatus in accordance with a first embodiment of the present invention.

FIG. 1 is a perspective view showing the external appearance of an information processing apparatus 1 in accordance with the first embodiment.

The information processing apparatus 1 is a tablet-type terminal apparatus and includes a body unit 10 and a binder 30 as a case.

The body unit 10 includes a touch display unit 14 for screen display and touch input and an image pickup unit 15 as an image pickup unit.

The binder 30 includes a first cover 30a as a first case and a second cover 30b as a second case. The first cover 30a and the second cover 30b are connected to each other through a hinge part 30c as a rotating shaft so that the binder 30 is closeable (or openable). In other words, the first cover 30a and the second cover 30b can be close to (or away from) each other in a state in which the first cover 30a and the second cover 30b are connected to each other through the hinge part 30c.

On the first cover 30a, a recording medium 40 is disposed, and the second cover 30b is provided with the body unit 10. Each of the body unit 10 and the recording medium 40 is attached to the binder 30 through a latch, a hook or the like in such a way as to be detachable therefrom.

In the embodiment, the recording medium 40 is a medium where information to be photographed is recorded, namely, a subject where information is recorded. Examples of the recording medium 40 include electronic paper which can electronically display information.

The first cover 30a and the second cover 30b are each in the shape of a rectangular flat plate, and the binder 30 is closeable/openable through the hinge part 30c as if a book or a notebook is opened/closed.

FIG. 1 shows a state in which the first cover 30a and the second cover 30b form an angle of 180° (open state).

In this state, a user refers to a screen displayed on the touch display unit 14, performs touch input thereon and writes down characters, figures and the like on the recording medium 40.

The hinge part 30c is provided with an open-close angle sensor 20 to detect an angle formed by the first cover 30a and the second cover 30b.

The open-close angle sensor 20 is constituted of a rotary encoder to detect rotation of the rotating shaft of the hinge part 30c or a magnetic sensor to detect an open-close state of the binder 30 by using a hall element or the like.

The recording medium 40 is a notebook or a writing pad which a user uses to take a note, paper on which a material (document) is printed, a book or the like. As long as the recording medium 40 is a recording medium on which information to be photographed is recorded, the raw material (type) of the recording medium 40 is not limited to paper. The recording medium 40 may be one sheet of paper or a plurality of sheets (pages) bound in a form of a book.

Figure 2:
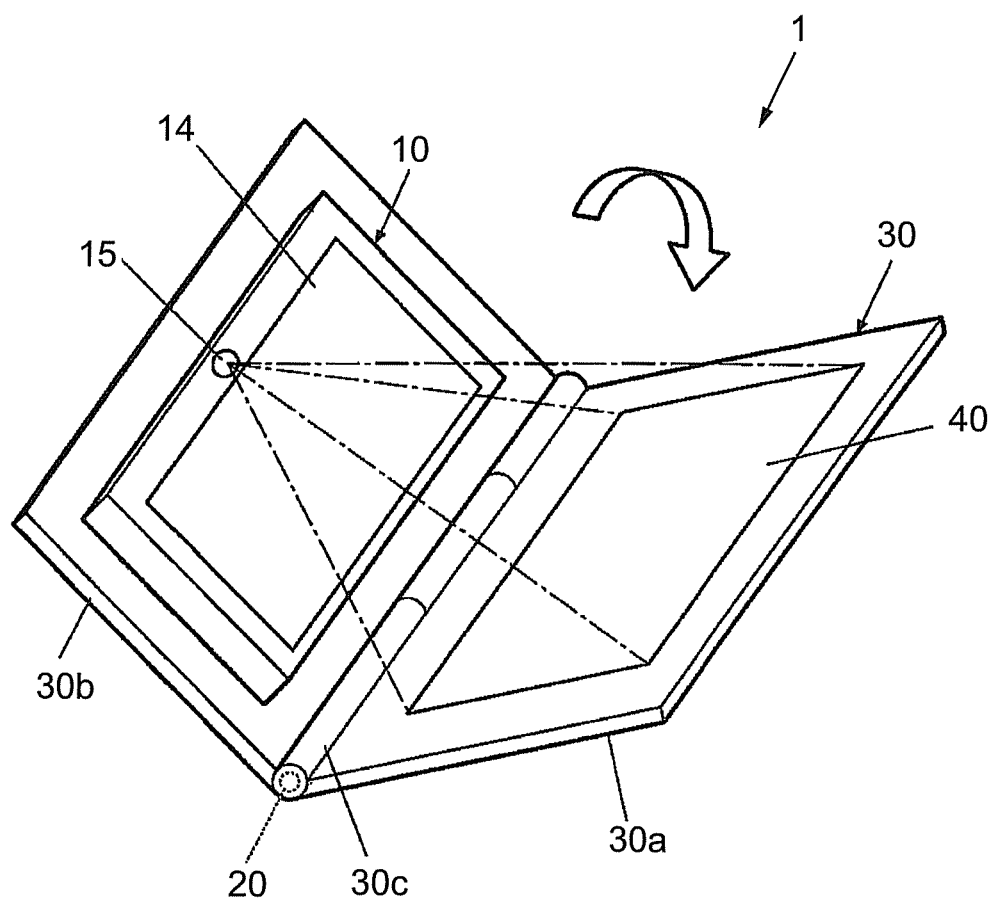
FIG. 2 shows a state in which a binder (case) including a first cover (first case) and a second cover (second case) is being closed.

FIG. 2 shows a state in which the binder 30 including the first cover 30a and the second cover 30b is being closed.

The image pickup unit 15 is disposed at a point of the body unit 10 so as to face the first cover 30a. When the first cover 30a and the second cover 30b form a predetermined angle (for example, 70°), the image pickup unit 15 photographs the recording medium 40.

The predetermined angle is preset to an optimum angle for photographing the recording medium 40 (optimum angle for photography), and photography conditions of a focus, an exposure and the like are set to be suitable for the angle.

While a user is closing the binder 30 (making an angle formed by the first cover 30a and the second cover 30b 0°), the angle formed by the first cover 30a and the second angle 30b passes through the predetermined angle. Hence, a user can photograph the recording medium 40 without noticing it.

Figure 3:
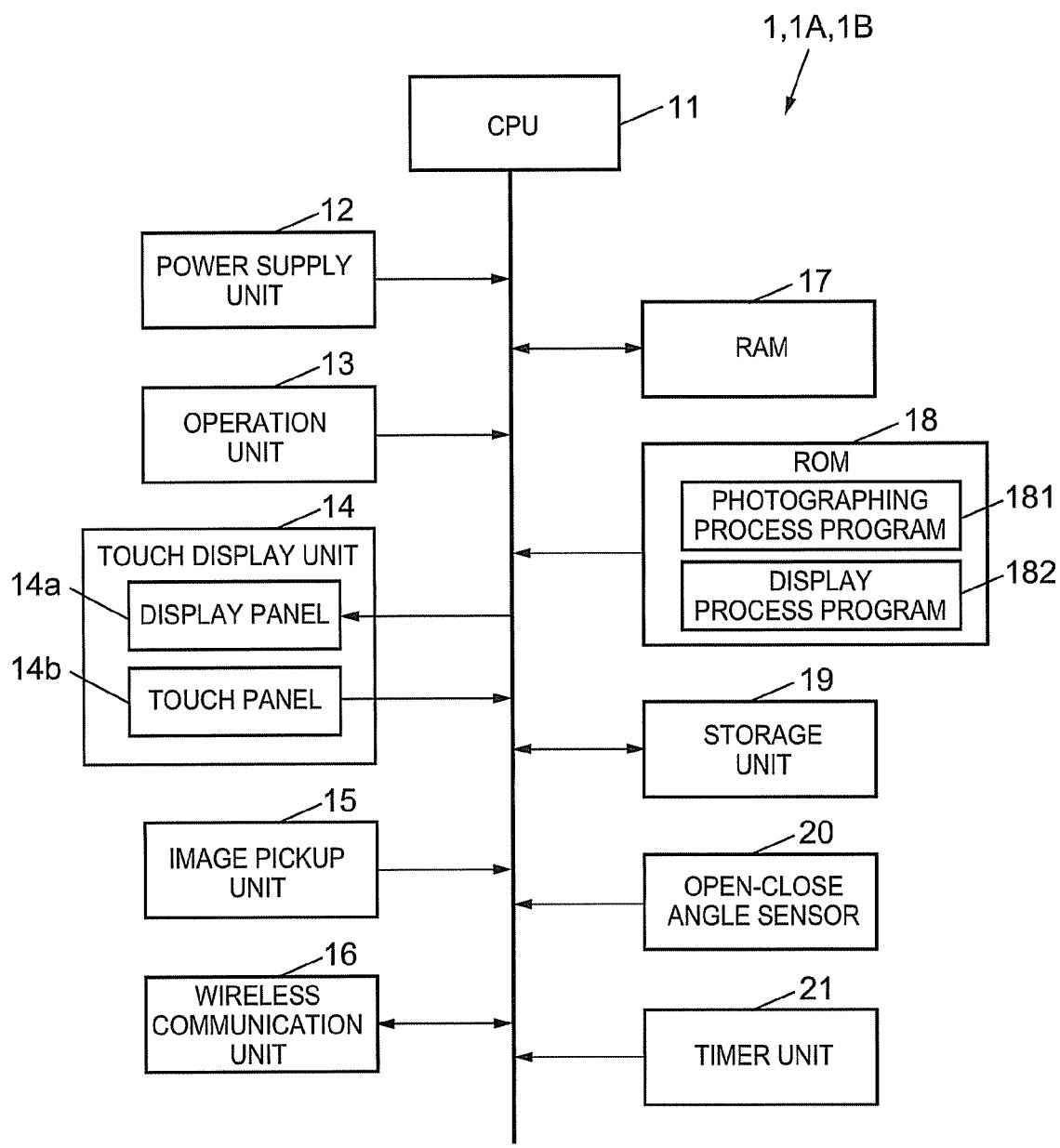
FIG. 3 is a block diagram showing the functional configuration of the information processing apparatus.

FIG. 3 is a block diagram showing the functional configuration of the information processing apparatus 1.

The information processing apparatus 1 includes: a CPU (Central Processing Unit) 11 as a photography control unit, storage control unit, closing detection unit and a display control unit; a power supply unit 12; an operation unit 13; the touch display unit 14; the image pickup unit 15; a wireless communication unit 16; a RAM (Random Access Memory) 17; a ROM (Read Only Memory) 18; a storage unit 19; and the open-close angle sensor 20.

The CPU 11 integrally controls process operations of the units and the like (components) of the information processing apparatus 1 in response to operation signals inputted from the operation unit 13 or the touch display unit 14 or instruction signals received by the wireless communication unit 16.

More specifically, the CPU 11 reads various process programs stored in the ROM 18 to open the programs in the RAM 17 and performs various processes in coordination with the programs.

The power supply unit 12 supplies power to the components of the information processing apparatus 1.

The operation unit 13 includes operation keys such as a power key to turn on/off power and outputs operation signals corresponding to the operation keys to the CPU 11.

The touch display unit 14 is constituted of a touch panel 14b disposed on a display panel 14a as a display unit. The display panel 14a is constituted of an LCD (Liquid Crystal Display) or the like and performs screen display in response to display control signals outputted from the CPU 11.

The display panel 14a displays a material image as a first image thereon.

The touch panel 14b detects positions of touch operations made by a figure of a user or the like and outputs operation signals corresponding to the positions to the CPU 11. The touch panel 14b receives operation instructions from a user.

The image pickup unit 15 is a digital camera including an optical lens, an image pickup element and various sensors and photographs a subject.

The image pickup unit 15 photographs the recording medium 40 to generate a note image (or images) as a second image.

The wireless communication unit 16 is a wireless communication module to perform data communication by being connected to the Internet via a wireless LAN (Local Area Network) router.

The RAM 17 is a volatile memory. In the RAM 17, various programs executed by the CPU 11, data related to the programs and the like are temporarily stored.

The ROM 18 is a read-only semiconductor memory where various programs and various data are stored. In the ROM 18, a photographing process program 181, a display process program 182 and the like are stored.

The storage unit 19 is constituted of an HDD (Hard Disk Drive), a nonvolatile memory or the like. In the storage unit 19, information is stored in such a way as to be readable and writable.

More specifically, in the storage unit 19, electronic data of a material and the like are stored.

The electronic data of a material may be generated, for example, by presentation software to display characters, figures and the like in a slide form or in PDF® (Portable Document Format). The date format thereof is not limited.

The open-close angle sensor 20 detects an angle formed by the first cover 30a and the second cover 30b and outputs the detected angle to the CPU 11.

The CPU 11 detects that the binder 30, which includes the first cover 30a and the second cover 30b, is closed to a predetermined angle on the basis of the angle outputted from the open-close angle sensor 20.

The CPU 11 makes the image pickup unit 15 photograph the recording medium 40 at the timing when detecting that the binder 30 is closed to the predetermined state. The image data of a picked-up image (note image) is generated in a data form such as JPEG or TIFF.

The CPU 11 links and stores in the storage unit 19 the note image generated by the image pickup unit 15 with a material image displayed on the display panel 14a at the time when the CPU 11 detects that the binder 30 is closed to the predetermined state. The image data obtained by screen capturing of the material image displayed on the display panel 14a is generated in a data form of JPEG, GIF, PNG or the like.

When an operation instruction (switching instruction) to switch display is inputted from the touch panel 14b in a state in which a material image stored in the storage unit 19 is displayed on the display panel 14a, the CPU 11 reads from the storage unit 19 a note image linked with the material image displayed on the display panel 14a and displays the read note image on the display panel 14a.

When the operation instruction to switch display is inputted from the touch panel 14b in a state in which a note image stored in the storage unit 19 is displayed on the display panel 14a, the CPU 11 reads from the storage unit 19 a material image linked with the note image displayed on the display panel 14a and displays the read material image on the display panel 14a.

Next, operations of the information processing apparatus 1 are described.

Figure 4:
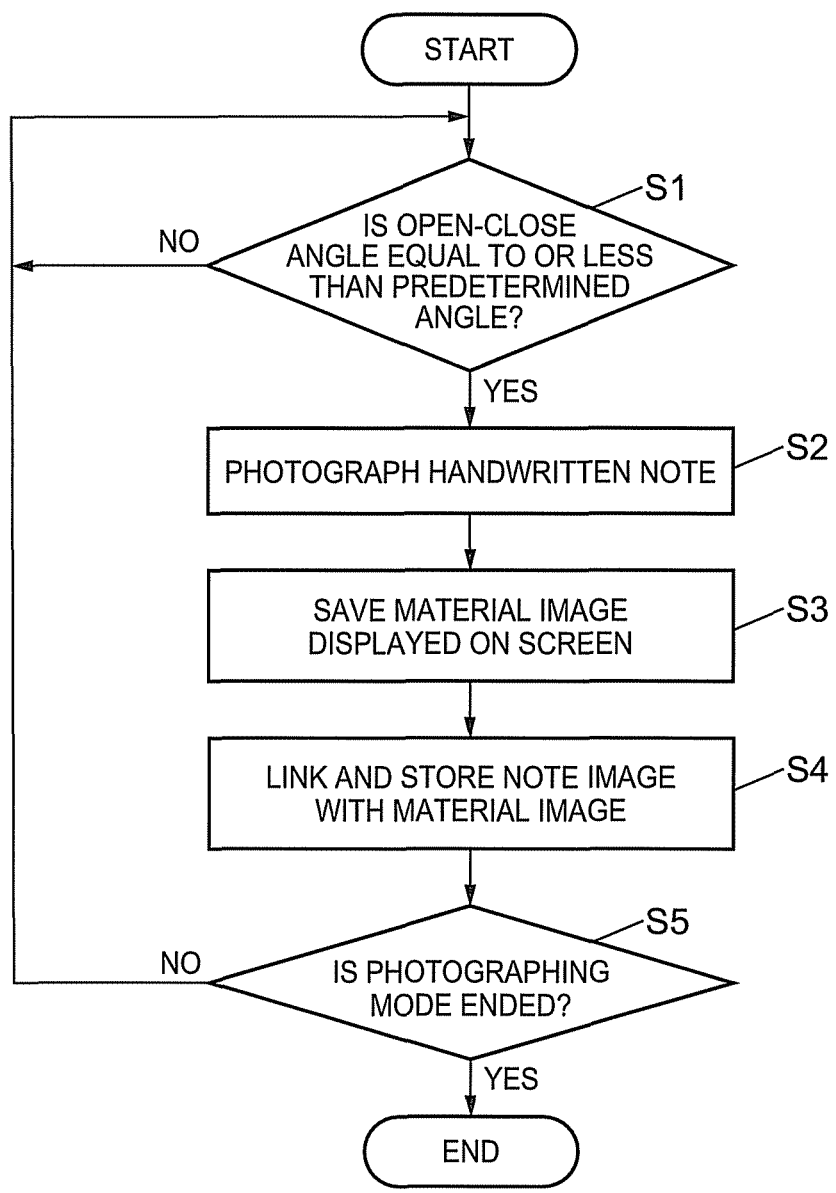
FIG. 4 is a flowchart of a first photographing process.

FIG. 4 is a flowchart of a first photographing process performed by the information processing apparatus 1.

This process is realized by a software process by the CPU 11 working in coordination with the photographing process program 181 stored in the ROM 18.

First, the CPU 11 determines whether or not the open-close angle is equal to or less than a predetermined angle (70°, for example) on the basis of an angle which is formed by the first cover 30a and the second cover 30b and outputted from the open-close angle sensor 20 (Step S1). That is, the CPU 11 determines whether or not the binder 30, which includes the first cover 30a and the second cover 30b, is closed to a predetermined state.

When determining that the open-close angle is equal to or less than a predetermined angle (Step S1; YES), namely, when determining that the binder 30 is closed to a predetermined angle, the CPU 11 controls the image pickup unit 15 so that a handwritten note recorded on the recording medium 40 is photographed and obtains a note image generated by the image pickup unit 15 (Step S2).

For example, the CPU 11 extracts the region of the recording medium 40 from a picked-up image outputted from the image pickup unit 15 and performs, for example, a process to correct trapezoidal (keystone) distortion on the extracted region. The CPU 11 stores image data of the note image in the RAM 17.

Next, the CPU 11 captures a material image displayed on the display panel 14a of the touch display unit 14 to save the material image (screen shot). The CPU 11 stores image data of the material image in the RAM 17 (Step S3).

Next, the CPU 11 links and stores the note image obtained at Step S2 with the material image saved at Step S3 in the storage unit 19 (Step S4).

Next, the CPU 11 determines whether or not an instruction to end a photographing mode is inputted by user operation onto the touch panel 14b (Step S5).

When determining that the open-close angle is more than a predetermined angle (Step S1; NO) or when determining that an instruction to end a photographing mode is inputted (Step S5; NO), the CPU 11 returns to Step 1 to repeat the step and the following steps.

When determining that an instruction to end a photographing mode is inputted (Step S5; YES), the CPU 11 ends the first photographing process.

Figure 5:
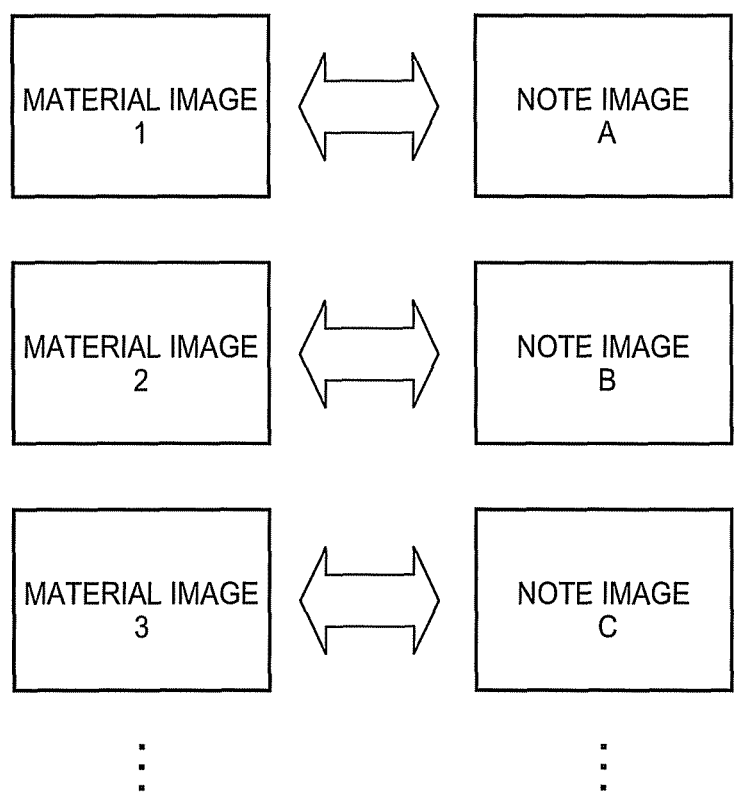
FIG. 5 is an illustration for explaining a state in which material images and note images are linked with each other.

As shown in FIG. 5, material images and note images are linked with each other by the first photographing process.

In the embodiment, material images and note images are linked with each other one-to-one. Alternatively, one material image and a plurality of note images or a plurality of material images and one note image may be linked with each other.

If the material image displayed on the display panel 14a at Step S3 is the same as the material image previously captured, Step S3 may be omitted.

Figure 6:
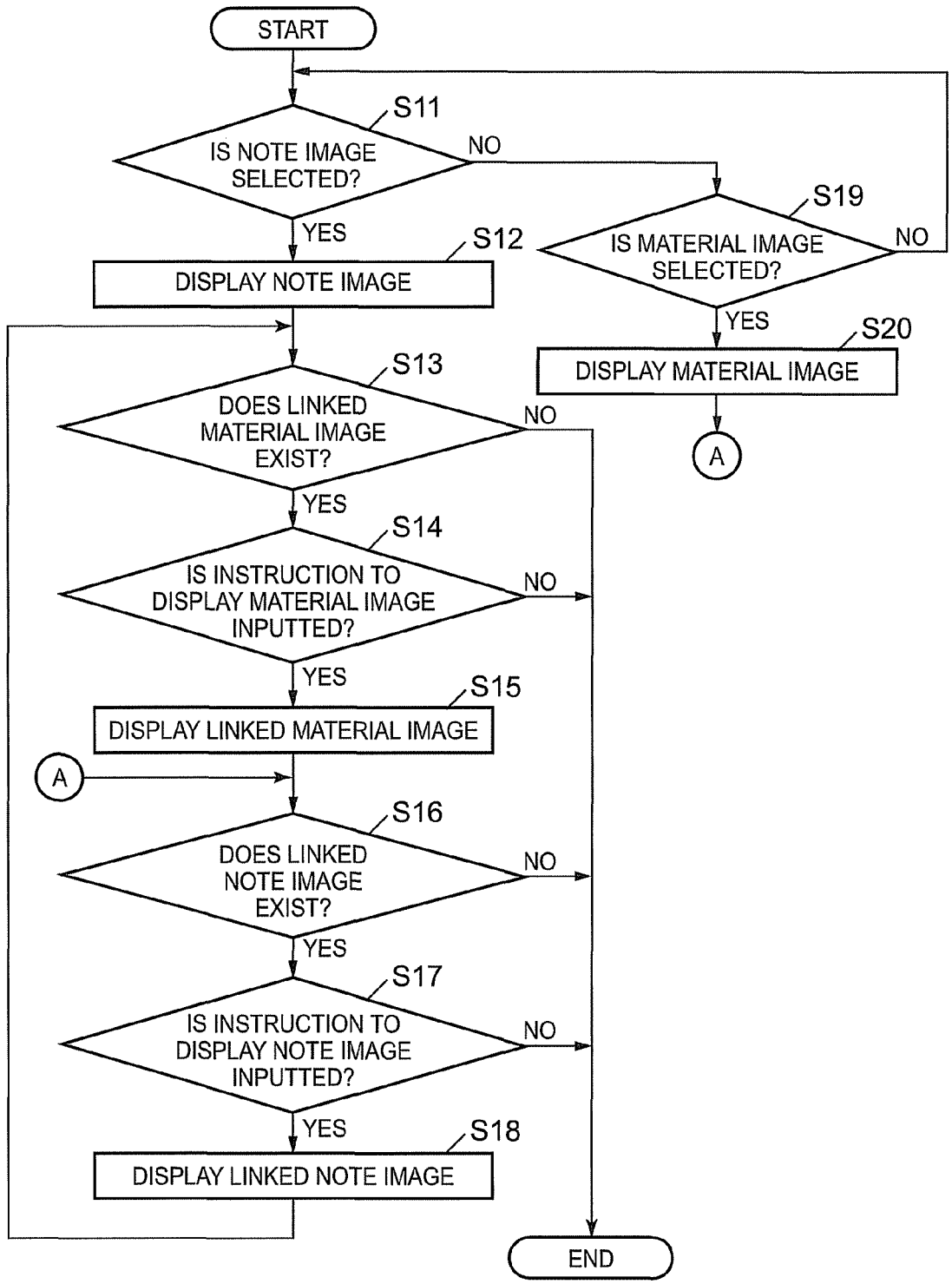
FIG. 6 is a flowchart of a display process.

Next, a display process performed by the information processing apparatus 1 is described with reference to FIG. 6.

This process is realized by a software process by the CPU 11 working in coordination with the display process program 182 stored in the ROM 18.

First, the CPU 11 determines whether or not a note image to be displayed is selected from among note images stored in the storage unit 19 through user operation onto the touch panel 14b (Step S11).

When determining that a note image to be displayed is selected (Step S11; YES), the CPU 11 reads the selected note image from the storage unit 19 to display the read note image on the display panel 14a (Step S12).

Next, the CPU 11 determines whether or not a material image linked with the note image displayed on the display panel 14a is stored in the storage unit 19 (Step S13).

When determining that a material image linked with the displayed note image is stored in the storage unit 19 (Step S13; YES), the CPU 11 determines whether or not an instruction to display a material image linked with the displayed note image is inputted by user operation onto the touch panel 14b (Step S14).

That is, the CPU 11 determines whether or not the operation instruction to switch display is inputted.

Figure 7A:
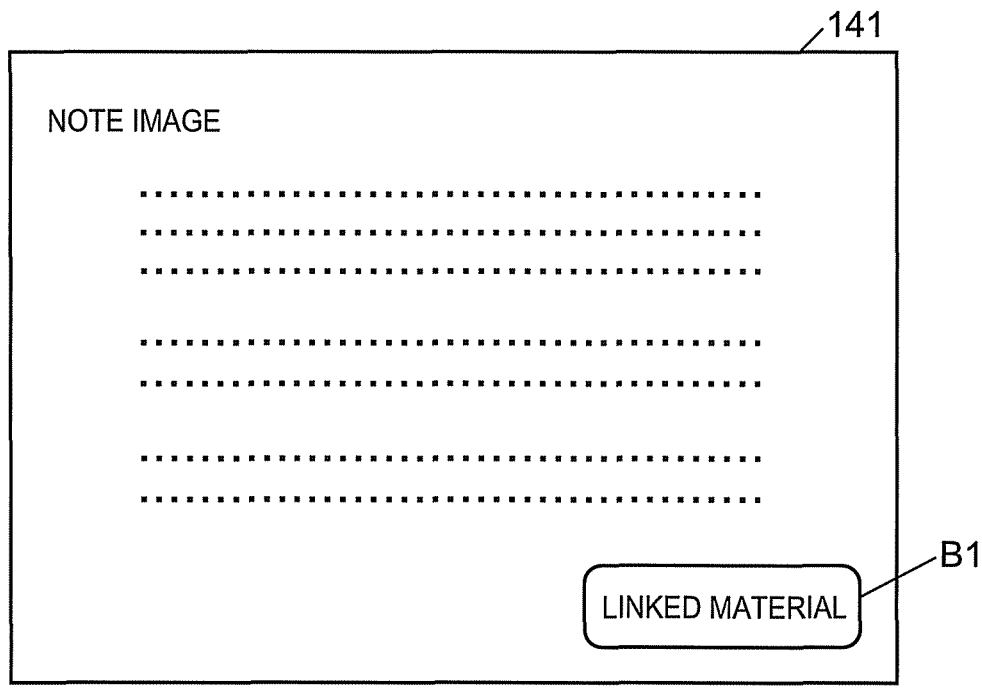
FIG. 7A shows an example of a note image display screen.

FIG. 7A shows an example of a note image display screen 141 displayed on the display panel 14a.

On the note image display screen 141, a note image is displayed. When a material image linked with the note image exists, a switching button B1 is displayed on the note image display screen 141. A user touches the switching button B1 to make an instruction to display a material image linked with the displayed note image.

At Step S14, when determining that an instruction to display a material image linked with the displayed note image is inputted (Step S14; YES), the CPU 11 reads a material image linked with the displayed note image from the storage unit 19 to display the read material image on the display panel 14a (Step S15).

Next, the CPU 11 determines whether or not a note image linked with the material image displayed on the display panel 14a is stored in the storage unit 19 (Step S16).

When determining that a note image linked with the displayed material image is stored in the storage unit 19 (Step S16; YES), the CPU 11 determines whether or not an instruction to display a note image linked with the displayed material image is inputted by user operation onto the touch panel 14b (Step S17). That is, the CPU 11 determines whether or not the operation instruction to switch display is inputted.

Figure 7B:
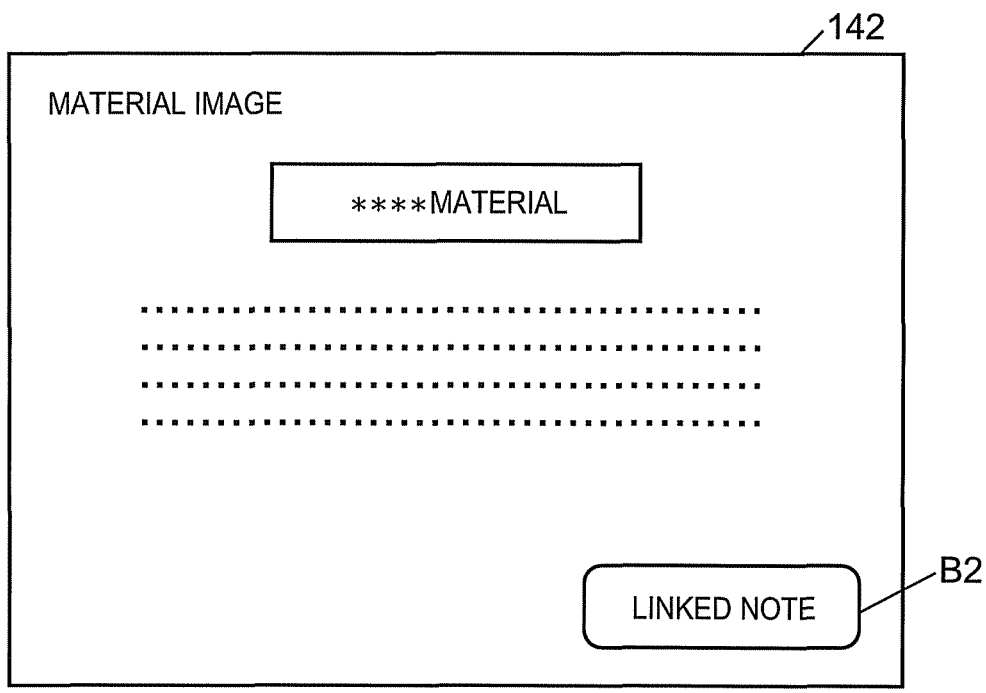
FIG. 7B shows an example of a material image display screen.

FIG. 7B shows an example of a material image display screen 142 displayed on the display panel 14a.

On the material image display screen 142, a material image is displayed. When a note image linked with the material image exists, a switching button B2 is displayed on the material image display screen 142. A user touches the switching button B2 to make an instruction to display a note image linked with the displayed material image.

At Step S17, when determining that an instruction to display a note image linked with the displayed material image is inputted (Step S17; YES), the CPU 11 reads a note image linked with the displayed material image from the storage unit 19 to display the read note image on the display panel 14a (Step S18) and proceeds to Step S13.

At Step S11, when determining that a note image to be displayed is not selected (Step S11; NO), the CPU 11 determines whether or not a material image to be displayed is selected from among material images stored in the storage unit 19 through user operation onto the touch panel 14b (Step S19).

When determining that a material image to be displayed is selected (Step S19; YES), the CPU 11 reads the selected material image from the storage unit 19 to display the read material image on the display panel 14a (Step S20) and proceeds to Step S16.

On the other hand, when determining that a material image to be displayed is not selected (Step S19; NO), the CPU 11 returns to Step S11.

When determining that a material image linked with the displayed note image is not stored in the storage unit 19 (Step S13; NO), determining that an instruction to display a material image linked with the displayed note image is not inputted (Step S14; NO), determining that a note image linked with the displayed material image is not stored in the storage unit 19 (Step S16; NO) or determining that an instruction to display a note image linked with the displayed material image is not inputted (Step S17; NO), the CPU 11 ends the display process.

As described above, according to the information processing apparatus 1 of the first embodiment, the image pickup unit 15 photographs the recording medium 40 at the timing when the binder 30, which includes the first cover 30a and the second cover 30b, being closed to a predetermined state is detected, and a note image generated by the image pickup unit 15 and a material image displayed on the display panel 14a at the timing when the binder 30 being closed to the predetermined state is detected are linked with each other and stored in the storage unit 19. Accordingly, a correspondence between the contents (note images) recorded on the recording medium 40 and the contents (material images) displayed on the display panel 14a can be easily referred to.

Further, because the recording medium 40 is photographed at the timing when the binder 30 being closed to a predetermined state is detected, the recording medium 40 can be easily photographed.

Further, in a state in which a material image is displayed on the display panel 14a, the material image displayed thereon can be easily switched to a note image linked with the material image so that the note image is displayed thereon. Also, in a state in which a note image is displayed on the display panel 14a, the note image displayed thereon can be easily switched to a material image linked with the note image so that the material image is displayed thereon.

It is possible to (i) photograph or scan a handwritten note in advance to generate electronic data of a note image, (ii) photograph a material (recording medium 40) in a state in which the note image is displayed on the display panel 14a and (iii) link and store the material image (second image) obtained by photographing the material with the note image (first image) displayed on the display panel 14a at the timing when the material is photographed.

The detection method of the open-close angle formed by the first cover 30a and the second cover 30b is not limited to the above described method. For example, it is possible to attach a symbol to a predetermined point on the first cover 30a and detect that the binder 30, which includes the first cover 30a and the second cover 30b, is closed to a predetermined state on the basis of the position of the symbol in an image taken by the image pickup unit 15.

Alternatively, it is possible to provide the second cover 30b with an acceleration sensor inside and detect the direction of gravity with the acceleration sensor to detect the open-close angle formed by the first cover 30a and the second cover 30b.

Second Embodiment

Next, a second embodiment to which the present invention is applied is described.

Figure 8A:
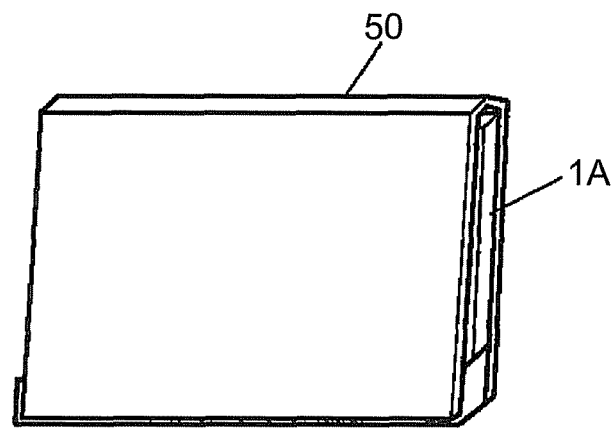
FIG. 8A shows a state in which an information processing apparatus in accordance with a second embodiment of the present invention is housed in a body cover.
Figure 8B:
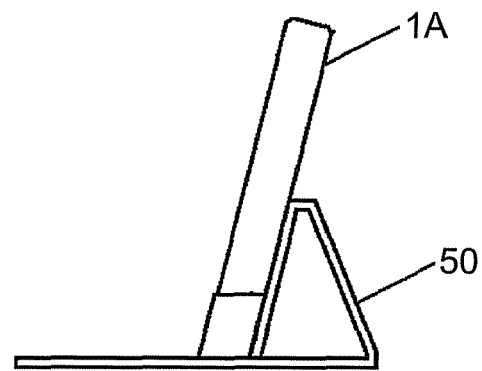
FIG. 8B is a lateral view showing a state in which the information processing apparatus stands against the body cover.
Figure 8C:
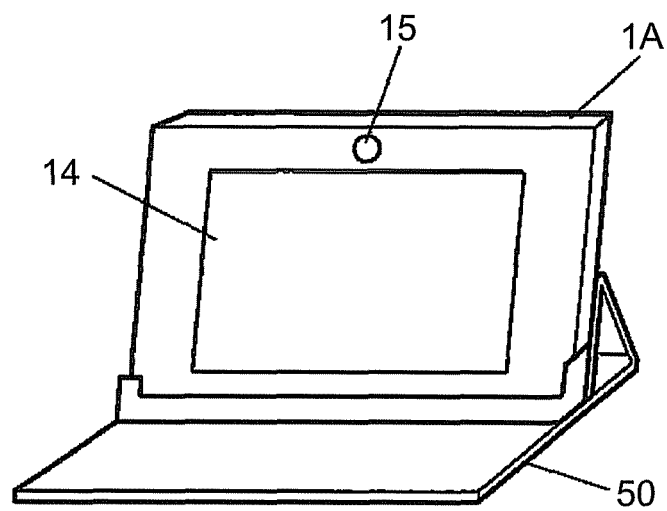
FIG. 8C is a perspective view showing a state in which the information processing apparatus stands against the body cover.

FIG. 8A shows a state in which an information processing apparatus 1A in accordance with the second embodiment is housed in a body cover 50. FIGS. 8B and 8C each show a state in which the information processing apparatus 1A stands against the body cover 50.

The components of the information processing apparatus 1A same as those of the information processing apparatus 1 of the first embodiment are denoted by the reference numbers same as those in the first embodiment, and description thereof is omitted.

Figure 9:
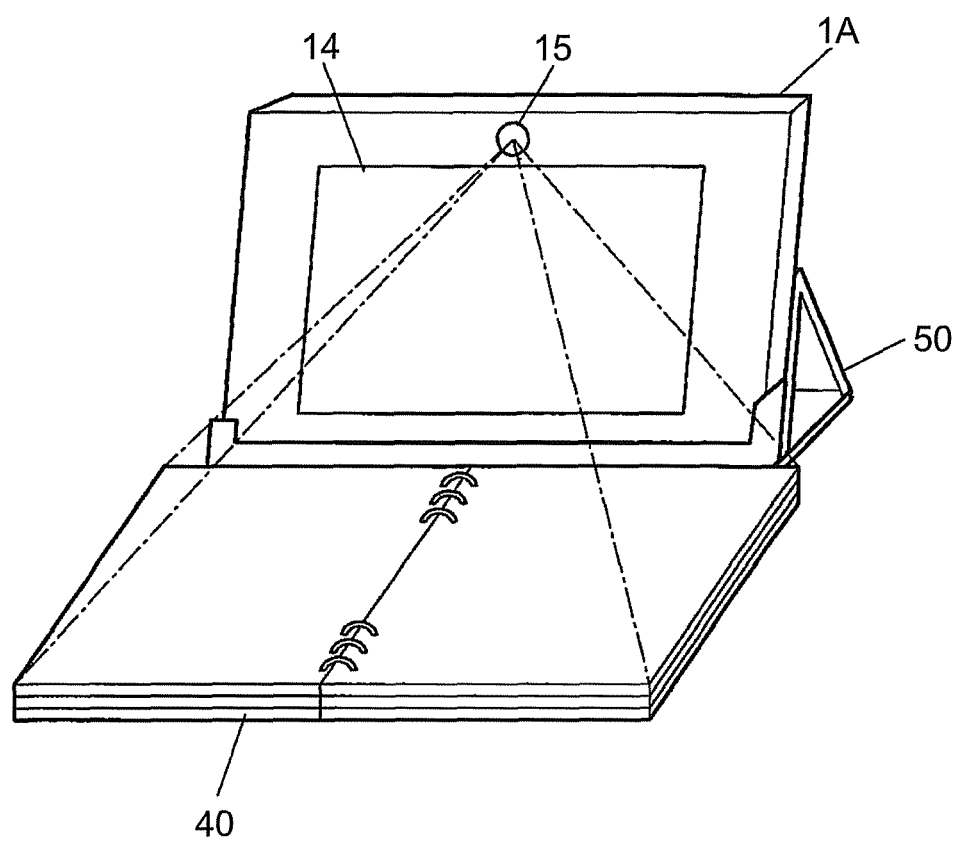
FIG. 9 shows a state in which a recording medium is placed in front of the information processing apparatus.

FIG. 9 shows a state in which the information processing apparatus 1A stands against the body cover 50, and the recording medium 40 is placed in front of the information processing apparatus 1A.

In the second embodiment, the recording medium 40 is composed of a plurality of pages in a form of a book, and the recording medium 40 is photographed by the image pickup unit 15 at timings when pages of the recording medium 40 are turned (page-turning operation). The angle of view and the focus of the image pickup unit 15 are preset to be suitable for the recording medium 40 placed in such a way that the upper end of the recording medium 40 and the lower end of the information processing apparatus 1A are lined up.

The information processing apparatus 1A is the same as the information processing apparatus 1 of the first embodiment except for the information processing apparatus 1A not requiring the open-close angle sensor 20 and the binder 30. Hence, description of the components same as those of the information processing apparatus 1 is omitted by citing FIG. 3.

In the following, the components, operations and the like characteristic of the second embodiment are described.

The CPU 11 takes in video image data obtained by the image pickup unit 15 continuously photographing (shooting) the recording medium 40 and analyzes the video image data to detect the page-turning operation by which pages of the recording medium 40 are turned.

It is assumed that the image data outputted from the image pickup unit 15 varying means that a page of the recording medium 40 is being turned to another page (the next page) thereof or user's finger is moving, namely, the page-turning operation is being performed.

The CPU 11 keeps taking in the video image data obtained by the image pickup unit 15 continuously photographing the recording medium 40 and, when the image data does not vary, determines that the page-turning operation has been performed (completed).

The CPU 11 makes the image pickup unit 15 photograph the recording medium 40 to obtain image data of an image (still image) at the timing when detecting (completion of) the page-turning operation on the recording medium 40.

The CPU 11 links and stores in the storage unit 19 a note image generated by the image pickup unit 15 with a material image displayed on the display panel 14a at the timing when the page-turning operation on the recording medium 40 is detected.

Next, operations of the information processing apparatus 1A are described.

Figure 10:
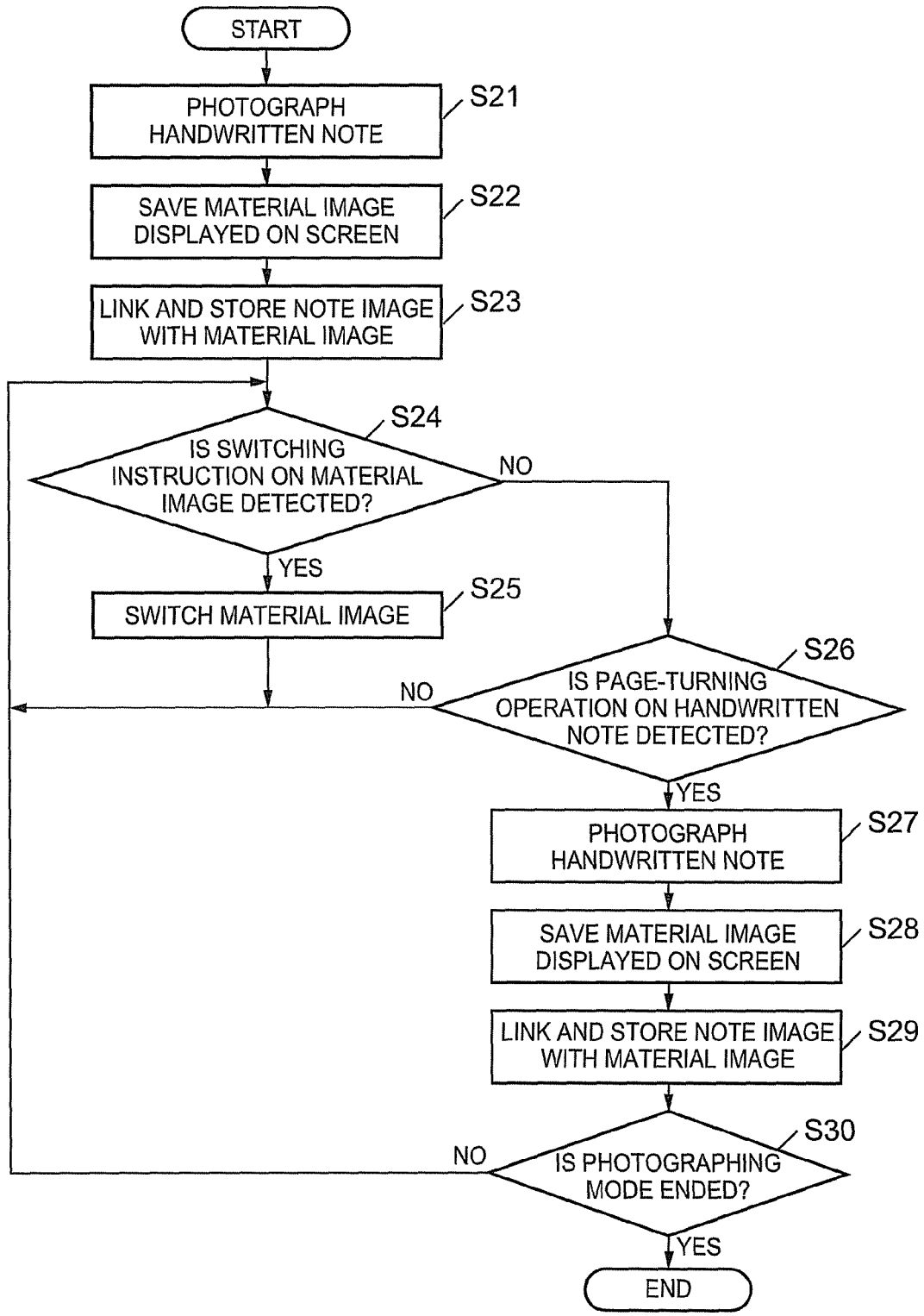
FIG. 10 is a flowchart of a second photographing process.

FIG. 10 is a flowchart of a second photographing process performed by the information processing apparatus 1A.

This process is realized by a software process by the CPU 11 working in coordination with the photographing process program 181 stored in the ROM 18.

This process is assumed to be performed in a case where, after a meeting or the like, a user photographs handwritten notes recorded on the recording medium 40 which is composed of a plurality of pages while displaying a material on the display panel 14a to check.

First, when an instruction to start a photographing mode is inputted by user operation onto the touch panel 14b, the CPU 11 controls the image pickup unit 15 so that a handwritten note recorded on the recording medium 40 is photographed and obtains a note image (still image) generated by the image pickup unit 15 (Step S21). The CPU 11 stores image data of the note image in the RAM 17.

Next, the CPU 11 captures a material image displayed on the display panel 14a to save the material image (Step S22). The CPU 11 stores image data of the material image in the RAM 17.

Next, the CPU 11 links and stores the note image obtained at Step S21 with the material image saved at Step S22 in the storage unit 19 (Step S23).

Next, the CPU 11 determines whether or not an instruction to switch the material image displayed on the display panel 14a is inputted by user operation onto the touch panel 14b, namely, detects a switching instruction to switch a material image displayed on the display panel 14a to the next material image (i.e., to switch a page of a material composed of a plurality of pages to the next page) (Step S24).

When determining that an instruction to switch the material image displayed on the display panel 14a is inputted (Step S24; YES), the CPU 11 switches the material image to the next material image (next page of the material) based on the electronic data of the material stored in the storage unit 19 to display the next material image on the display panel 14a (Step S25).

On the other hand, when determining that an instruction to switch the material image displayed on the display panel 14a is not inputted (Step S14; NO), the CPU 11 determines whether or not the page-turning operation on handwritten notes (recording medium 40) is detected on the basis of video image data continuously taken in from the image pickup unit 15 (Step S26).

When determining that the page-turning operation on handwritten notes is detected (Step S26; YES), the CPU 11 controls the image pickup unit 15 so that a handwritten note recorded on the recording medium 40 is photographed and obtains a note image (still image) generated by the image pickup unit 15 (Step S27). The CPU 11 stores image data of the note image in the RAM 17.

Next, the CPU 11 captures a material image displayed on the display panel 14a to save the material image (Step S28). The CPU 11 stores image data of the material image in the RAM 17.

Next, the CPU 11 links and stores the note image obtained at Step S27 with the material image saved at Step S28 in the storage unit 19 (Step S29).

Next, the CPU 11 determines whether or not an instruction to end the photographing mode is inputted by user operation onto the touch panel 14b (Step S30).

When determining that the page-turning operation on handwritten notes is not detected (Step S26; NO), determining that an instruction to end the photographing mode is not inputted (Step S30; NO) or after Step S25, the CPU 11 returns to Step S24 to repeat the step and the following steps.

At Step S30, when determining that an instruction to end the photographing mode is inputted (Step S30; YES), the CPU 11 ends the second photographing process.

If the material image displayed on the display panel 14a at Step S28 is the same as the material image previously captured, Step S28 may be omitted.

The display process to display a material image or a note image, the material image and the note image being linked with each other by the second photographing process, is the same as that described in the first embodiment.

As described above, according to the information processing apparatus 1A of the second embodiment, the image pickup unit 15 photographs the recording medium 40 at the timing when the page-turning operation on the recording medium 40 is detected, and a note image generated by the image pickup unit 15 and a material image displayed on the display panel 14a at the timing when the page-turning operation on the recording medium 40 is detected are linked with each other and stored in the storage unit 19. Accordingly, a correspondence between the contents (note images) recorded on the recording medium 40 and the contents (material images) displayed on the display panel 14a can be easily referred to.

Further, because the recording medium 40 is photographed at the timing when the page-turning operation on the recording medium 40 is detected, the recording medium 40 can be easily photographed.

It is possible to (i) photograph or scan handwritten notes in advance to generate electronic data of note images, (ii) photograph a material (recording medium 40) composed of a plurality of pages in a form of a book in a state in which a note image is displayed on the display panel 14a each time the page-turning operation on the material is detected and (iii) link and store the material images obtained by photographing the material with their relevant note images displayed on the display panel 14a at their respective timings when the note images are photographed.

The detection method of the page-turning operation is not limited to the above described method. For example, it is possible to attach a page-identification-use mark for identifying a page to a predetermined point on each page of the recording medium 40 and determine that the page-turning operation is detected when the page-identification-use mark is detected from a predetermined point in an image taken in from the image pickup unit 15.

Third Embodiment

Next, a third embodiment to which the present invention is applied is described.

An information processing apparatus 1B of the third embodiment is the same as the information processing apparatus 1 of the first embodiment except for the information processing apparatus 1B not requiring the open-close angle sensor 20 and the binder 30. Hence, description of the components same as those of the information processing apparatus 1 is omitted by citing FIG. 3.

In the following, the components, operations and the like characteristic of the third embodiment are described.

The CPU 11 detects a switching instruction to switch a material image displayed on the display panel 14a to the next material image (i.e., to switch a page of a material composed of a plurality of pages to the next page) on the basis of user operation onto the touch panel 14b.

The CPU 11 makes the image pickup unit 15 photograph the recording medium 40 at the timing when detecting the switching instruction.

The CPU 11 links and stores in the storage unit 19 a note image generated by the image pickup unit 15 with a material image displayed on the display panel 14a at the timing when the switching instruction is detected.

Next, operations of the information processing apparatus 1B are described.

Figure 11:
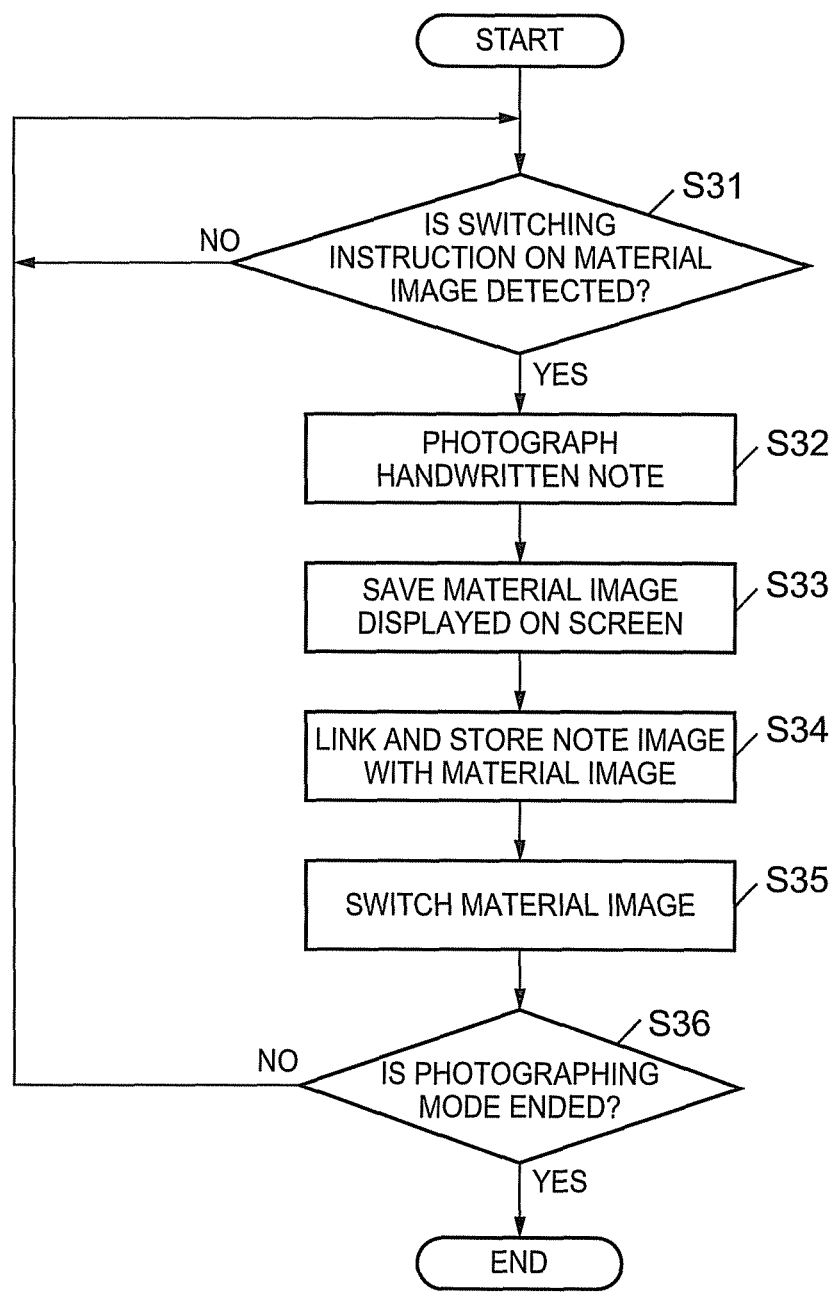
FIG. 11 is a flowchart of a third photographing process performed by an information processing apparatus in accordance with a third embodiment of the present invention.

FIG. 11 is a flowchart of a third photographing process performed by the information processing apparatus 1B.

This process is realized by a software process by the CPU 11 working in coordination with the photographing process program 181 stored in the ROM 18.

First, the CPU 11 determines whether or not an instruction to switch the material image displayed on the display panel 14a to the next material image is inputted by user operation onto the touch panel 14b, namely, whether or not the switching instruction is detected (Step S31).

When detecting the switching instruction (Step S31; YES), the CPU 11 controls the image pickup unit 15 so that a handwritten note recorded on the recording medium 40 is photographed and obtains a note image generated by the image pickup unit 15 (Step S32). The CPU 11 stores image data of the note image in the RAM 17.

Next, the CPU 11 captures a material image displayed on the display panel 14a to save the material image (Step S33). The CPU 11 stores image data of the material image in the RAM 17.

Next, the CPU 11 links and stores the note image obtained at Step S32 with the material image saved at Step S33 in the storage unit 19 (Step S34).

Next, the CPU 11 switches the material image to the next material image based on the electronic data of the material stored in the storage unit 19 to display the next material image on the display unit 14a (Step S35).

Before the material images are switched at Step S35, the material image to be linked with the note image is obtained at Step S33. Accordingly, a note image and a material image displayed at the timing when a note is written down can be linked with each other.

Next, the CPU 11 determines whether or not an instruction to end the photographing mode is inputted by user operation onto the touch panel 14b (Step S36).

When not detecting the switching instruction (Step S31; NO) or when determining that an instruction to end the photographing mode is not inputted (Step S36; NO), the CPU 11 returns to Step S31 to repeat the step and the following steps.

At Step S36, when determining that an instruction to end the photographing mode is inputted (Step S36; YES), the CPU 11 ends the third photographing process.

The display process to display a material image or a note image, the material image and the note image being linked with each other by the third photographing process, is the same as that described in the first embodiment.

As described above, according to the information processing information 1B of the third embodiment, the image pickup unit 15 photographs the recording medium 40 at the timing when the switching instruction to switch a material image displayed on the display panel 14a to the next material image is detected, and a note image generated by the image pickup unit 15 and a material image displayed on the display panel 14a at the timing when the switching instruction is detected are linked with each other and stored in the storage unit 19. Accordingly, a correspondence between the contents (note images) recorded on the recording medium 40 and the contents (material images) displayed on the display panel 14a can be easily referred to.

Further, because the recording medium 40 is photographed at the timing when the switching instruction is detected, the recording medium 40 can be easily photographed.

In the third embodiment, a material image displayed on the display panel 14a is switched to the next material image on the basis of user operation onto the touch panel 14b. However, if material images displayed on the display panel 14a are those received from an external device via the wireless communication unit 16, a material image being switched to the next material image may be determined, for example, when contents displayed on the display panel 14a change.

In this case, the contents displayed on the display panel 14a are switched regardless of user's intention. Consequently, a note image picked up when a material image is switched to the next image and a material image obtained by capturing the display panel 14a do not correspond to each other. In order to solve the problem, the first material image is obtained in advance, and the first material image and a note image picked up at the timing when switching the first material image to the second material image is completed are linked with each other.

Then, the second material image obtained by capturing the display panel 14a at the timing when switching the first material image to the second material image is completed and a note image picked up at the timing when switching the second material image to the third material image is completed are linked with each other, and so forth.

The embodiments described above (and below) are examples of an information processing apparatus of the present invention, and hence the present invention is not limited thereto. Various modifications can be appropriately made regarding the detailed configurations and operations of the components constituting the information processing apparatus without departing from the scope of the present invention.

For example, in the above embodiments, the linked material image and note image are displayed on the display panel 14a by being switched. However, the linked material image and note image may be displayed on the same screen of the display panel 14a at the same time by being placed next to each other.

Further, in order to print the linked material image and note image on the same page, print data thereof may be outputted to a printer via the wireless communication unit 16.

Further, the material images (material) displayed on the display panel 14a is not limited to those stored in the storage unit 19 in advance, and hence may be those obtained from an external device via the wireless communication unit 16, such as a Web display screen obtained from a Web server.

In the above, a ROM is used as a computer readable medium where the programs to perform the processes are stored. However, this is not a limitation but an example.

As another computer readable medium, a nonvolatile memory such as a flash memory or a portable medium such as a CD-ROM can be used. Further, as a medium to provide data of the programs via a communication line, a carrier wave can be used.

Fourth Embodiment

Next, a fourth embodiment to which the present invention is applied is described.

In the fourth embodiment, in the ROM 18 shown in FIG. 3, a scheduler program, an OCR (Optical Character Recognition) program, an image management program and a tag attachment program are stored.

The scheduler program is a program to manage schedules (times, events etc.) and to input, edit and display events, start times and end times thereof, attendees thereof and the like.

Information including an event, a date and time relevant to the event and/or attendees of the event as a schedule is referred to as event information.

The CPU 11, the scheduler program and the ROM 18 function as a scheduler (management unit).

FIGS. 12A and 12B each show a scheduler display screen displayed by the scheduler.

FIG. 12A shows a calendar display screen 411, and FIG. 12B shows an event (schedule) display screen 412.

On the calendar display screen 411 shown in FIG. 12A, a photography icon 51 and a registration icon 52 are displayed. The registration icon 52 is displayed on the event display screen 412 shown in FIG. 12B too. A user can register each individual event in the storage unit 19 from the scheduler display screen shown in FIGS. 12A and 12B.

FIG. 13 shows, in the scheduler as the management unit, the data structure stored in the storage unit 19.

With respect to each event, an ID, an event name, a date and time (a start date and time and an end date and time), an attendee (or attendees) and the like are registered.

The OCR program is a program to perform a recognition process by performing an image process on input image to generate binarized image data, collate the image data with pre-stored patterns to identify characters (letters, symbols and the like) and output character data.

The CPU 11 and the OCR program function as a recognition unit to recognize a date and time in image data.

The image management program is a program, for example, to display and manage image data of note images picked up by the image pickup unit 15.

FIG. 14 shows the data structure of note images managed through the image management program.

With respect to each note image, an ID, an image name, a linking date and time and the like are registered in the storage unit 19.

The tag attachment program is a program to attach tags to image data of note images picked up by the image pickup unit 15.

Next, operations of the information processing apparatus 1 of the fourth embodiment are described.

FIG. 2 shows a state in which the binder 30 of the information processing apparatus 1 is being closed.

A user can, for example, use the information processing apparatus 1 and write down characters, figures and the like on the recording medium 40 in a state in which the binder 30 is open at 180°. When a user does not use the information processing apparatus 1 and the recording medium 40, the first cover 30a and the second cover 30b can be attached to each other, so that the binder 30 is completely closed (the open-close angle is 0°).

Figure 15:
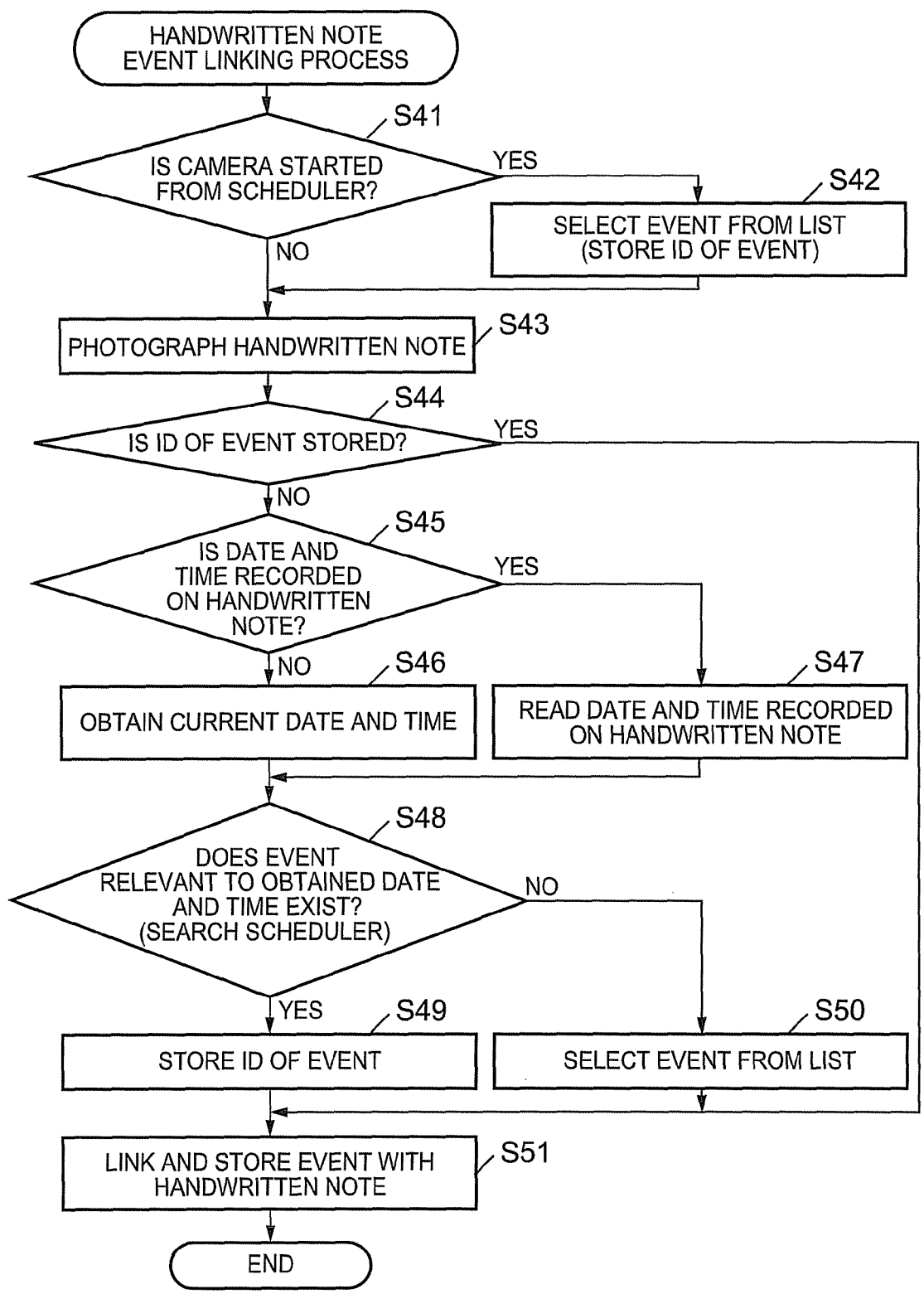
FIG. 15 is a flowchart of a handwritten note event linking process.

FIG. 15 shows a flowchart of a handwritten note event linking process performed by the information processing apparatus 1 of the fourth embodiment.

In the following, the handwritten note event linking process performed by the information processing apparatus 1 is described with reference to FIG. 15.

This process is performed by the CPU 11 working in coordination with the programs stored in the ROM 18.

As a prerequisite for the handwritten note event linking process, for example, a handwritten note is recorded on the recording medium 40, and then the binder 30 of the information processing apparatus 1 is to be closed in a state in which the information processing apparatus 1 is in operation.

In the handwritten note event linking process, as an optimum angle for recording medium 40 (optimum angle for photography), the open-close angle is set to 70°.

More specifically, when the open-close angle sensor 20 detects an angle of 70° (optimum angle for photography) as an angle formed by the first cover 30a and the second cover 30b, the CPU 11 obtains a note image generated by the image pickup unit 15. The photography conditions of a focus, an exposure and the like are set to be suitable for the optimum angle for photography (70°, for example).

First, the CPU 11 determines whether or not a camera is started from the scheduler (Step S41). More specifically, the CPU 11 determines whether or not the image pickup unit 15 is in a photographing mode by the photography icon 51 displayed on the calendar display screen 411 shown in FIG. 12A being selected in a state in which the scheduler is in operation. When determining that the image pickup unit 15 is in a photographing mode by the photography icon 51 displayed on the calendar display screen 411 being selected (Step S41;

YES), the CPU 11 proceeds to Step S42. On the other hand, when determining that the image pickup unit 15 is not in a photographing mode by the photography icon 51 displayed on the calendar display screen 411 being selected (Step S41; NO), the CPU 11 proceeds to Step S43.

At Step S42, when a user manually selects an event from a list of events (calendar display screen 411), the CPU 11 stores the ID of the selected event in the RAM 17 (Step S42). The ID thereof is an ID to identify an event registered in the scheduler.

At Step S43, the CPU 11 controls the image pickup unit 15 so that a handwritten note recorded on the recording medium 40 is photographed when detecting that the binder 30 is closed to a predetermined state through your operation and stores a note image generated by the image pickup unit 15 in the RAM 17 (Step S43).

Next, the CPU 11 determines whether or not the ID of an event is stored in the RAM 17 (Step S44).

The CPU 11 determines that the ID of an event is stored in the RAM 17 when the ID of the event selected by a user is stored in the RAM 17 at Step S42. When determining that the ID of an event is stored in the RAM 17 (Step S44; YES), the CPU 11 proceeds to Step S51. On the other hand, when determining that the ID of an event is not stored in the RAM 17 (Step S44; NO), the CPU 11 proceeds to Step S45.

At Step S45, the CPU 11 determines whether or not a date and time is recorded in a note image 151 picked up at Step S43 (Step S45).

Figure 16:
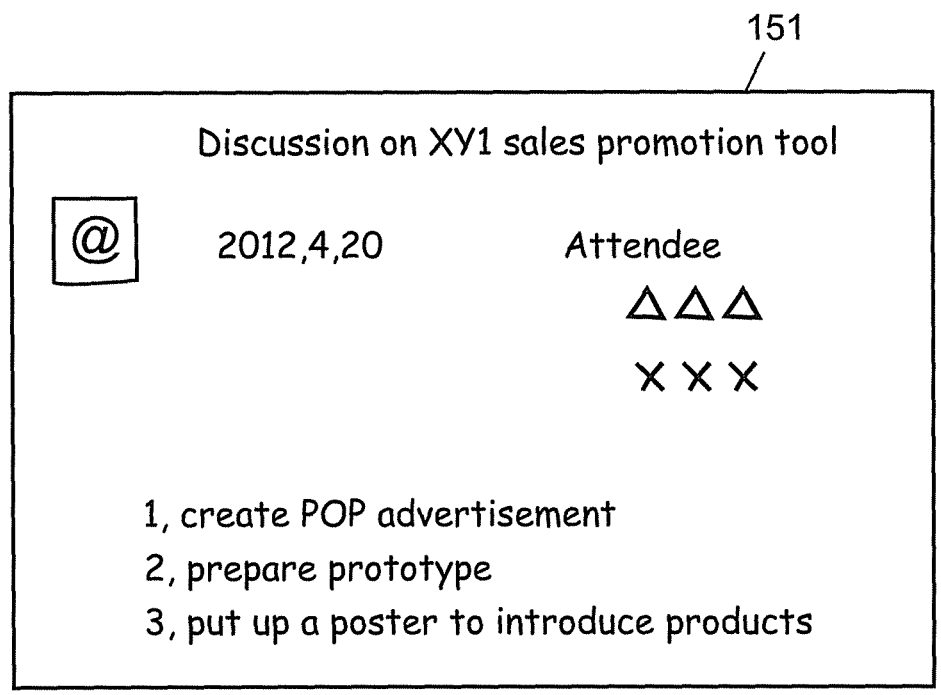
FIG. 16 shows an example of a note image.

FIG. 16 shows the picked-up note image 151.

More specifically, the CPU 11 executes the OCR program on the image data of the picked-up note image 151 shown in FIG. 16 to detect a predetermined mark. As the predetermined mark, for example, an @ in a square shown in FIG. 16, a # in a square or the like is used.

The mark should be the one which can be easily distinguished from other marks. If a date and time is recorded on the side of or near the predetermined mark, the CPU 11 recognizes the date and time through the OCR program. In the case of FIG. 16, the CPU 11 recognizes the date (and time) of "2012, 4, 20" (Apr. 20, 2012) recorded on the right side of the @ in a square.

Thus, the CPU 11 determines whether or not a date and time is recorded in a note image. When determining that a date and time is recorded in a note image (Step S45; YES), the CPU 11 proceeds to Step S47. On the other hand, when determining that a date and time is not recorded in a note image (Step S45; NO), the CPU 11 proceeds to Step S46.

Here, FIG. 15 is referred to again. At Step S46, the CPU 11 obtains a current date and time from a timer unit 21 (shown in FIG. 3). The timer unit 21 includes a timer circuit (RTC; Real Time Clock) to measure a current date and time and outputs the measured current date and time to the CPU 11. The current date and time is a date and time when the CPU 11 takes Step S46 and a date and time when a handwritten note is substantially photographed so that a note image is obtained.

The date and time recorded in a note image or the date and time (current date and time) when a handwritten note is photographed so that a note image is obtained is referred to as the linking date and time. The CPU 11 functions as an obtaining unit to obtain the linking date and time.

At Step S47, the CPU 11 reads and obtains the date and time recorded in the note image.

More specifically, as shown in FIG. 16, the CPU 11 reads and obtains the date and time of "2012, 4, 20" recorded on the right side of the @ in a square.

At Step S48, the CPU 11 determines whether or not an event (relevant event) relevant to the obtained current date and time or date and time recorded in the note image exists (Step S48).

More specifically, the CPU 11 refers to the data structure in the scheduler shown in FIG. 13 to search for and retrieve an event relevant to the date and time.

The relevant event is an event having a registered event period (defined by the start time and the end time of the event) in which the obtained current date and time or date and time recorded in the note image is included.

However, for example, an event such as a meeting may continue after its scheduled end time or start a little before its scheduled start time. By such situations taken into account, an event can be accepted as the relevant event even if the current date and time or the date and time recorded in a note image is somewhat before or after the registered event period of the event. For example, if there is an event having a registered event period the end time of which is a little earlier than the current date and time or the date and time recorded in a note image, the event is determined as the relevant event.

When determining that an event relevant to the obtained current date and time or date and time recorded in the note image exists (Step S48; YES), the CPU 11 proceeds to Step S49. On the other hand, when determining that an event relevant thereto does not exist (Step S48; NO), the CPU 11 proceeds to Step S50.

At Step S49, the CPU 11 stores the ID of the relevant event retrieved at Step S48 in the RAM 17 (Step S49).

At Step S50, the CPU 11 displays the list of events (calendar display screen 411) on the display panel 14a, and when a user specifies an event thereon, the CPU 11 selects the event and stores the ID thereof in the RAM 17 (Step S50).

At Step S51, the CPU 11 links the event retrieved at Step S48 or selected by a user at Step S50 with the note image (Step S51).

More specifically, the CPU 11 stores the ID of the event stored in the RAM 17 in the data structure of note images shown in FIG. 14 as an index. Then, the CPU 11 ends the handwritten note event linking process.

Next, an operation to display a note image performed by the CPU 11 working in coordination with the image management program is described.

Figure 17A:
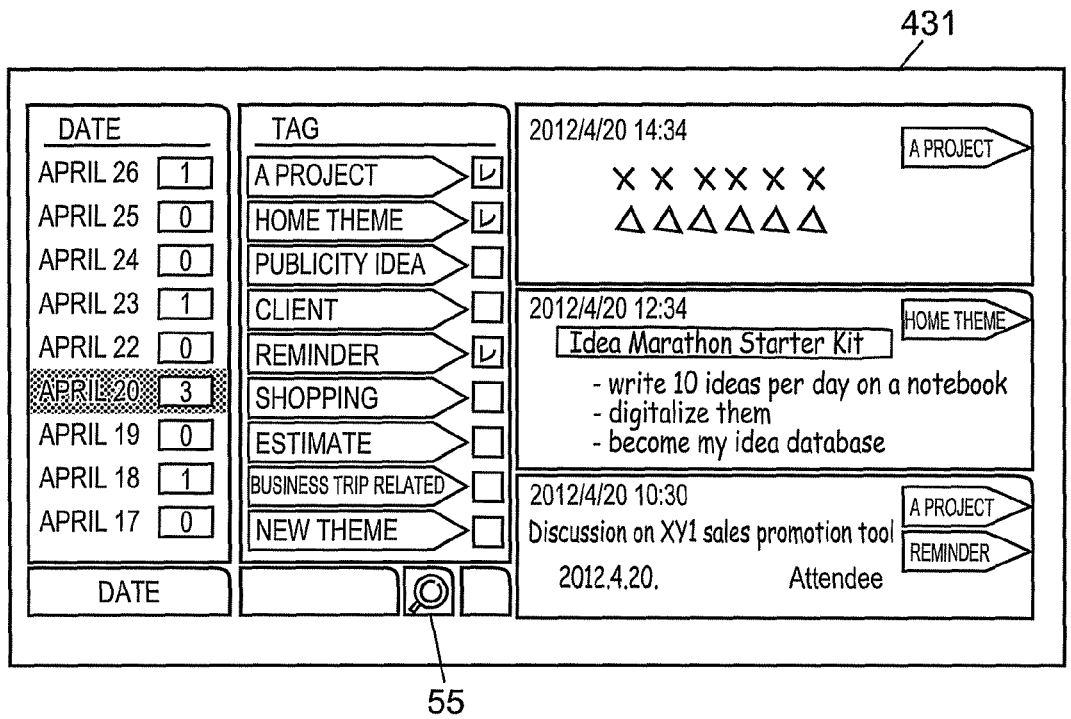
Figure 17B:
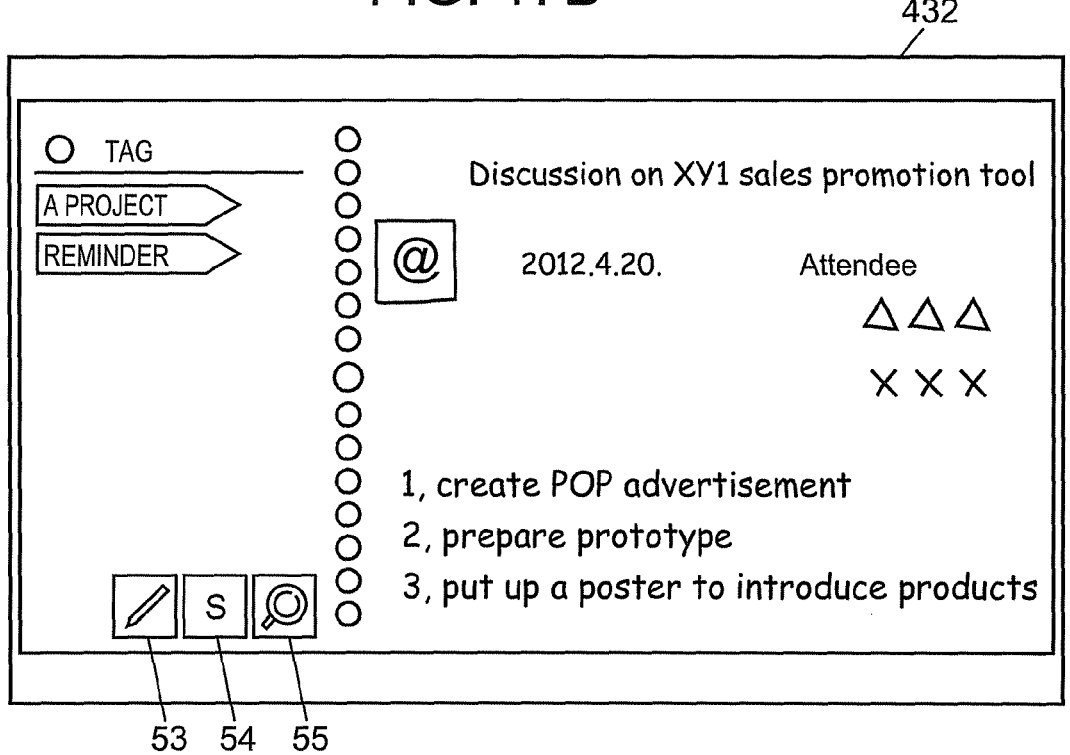

FIGS. 17A and 17B each show an example of a note image display screen displayed through the image management program.

FIG. 17A shows a note image list display screen 431, and FIG. 17B shows a note image one page display screen 432.

On the left and the center of the note image list display screen 431 shown in FIG. 17A, dates (date and time) and tags are displayed, respectively. In addition, note images to which selected tags are attached are displayed on the right on the note image list display screen 431.

In FIG. 17A, three note images are displayed.

The tags displayed on the center on the note image list display screen 431 are the ones attached to note images through the tag attachment program, the note images being picked up by the image pickup unit 15.

The tags are automatically attached to note images; for example, by utilizing the title of an event, a tag is attached to a note image which is relevant to the event according to the date and time information. The tags can be manually attached to note images through user operation onto a tag attachment icon 53. When a tag (or tags) and a date are specified, note images agreeing with the specified tag and date are displayed on the right on the note image list display screen 431.

When the note image at the bottom is selected from among three note images shown in FIG. 17, the note image list display screen 431 is switched to the note image one page display screen 432 to display the selected note image (one page).

Next, an operation to mutually read a note image and an event which are linked by the handwritten note event linking process is described.

The IDs of events and the IDs of note images, which are registered in the scheduler, are linked with each other. Consequently, a note image and an event can be mutually read; for example, a note image can be read by specifying an event or an event can be read by specifying a note image.

The details thereof are described below.

As shown in FIG. 12B, the event display screen 412 registered in the scheduler is displayed on the display panel 14a of the touch display unit 14.

On the event display screen 412, a note image icon 412i is displayed. The note image icon 412i indicates that a note image linked with this event exists as a result of the scheduler detecting an index described above.

In this state, when a user touches the note image icon 421i as user's operation instruction to switch display from the touch panel 14b, the CPU 11 determines that the operation instruction is inputted. Then, the CPU 11 reads a note image (image data) from the storage unit 19 through the image management program, the note image being linked with the event information (schedule information) displayed on the display panel 14a, and displays an image based on the read note image (image data) on the display panel 14a as shown in FIG. 17B.

Here, the CPU 11 functions as a display control unit to control such display.

Now, as shown in FIG. 17B, the note image based on the image data stored in the storage unit 19 is displayed on the display panel 14a of the touch display unit 14. In this state, when a user touches an event (schedule) button 54 as user's operation instruction to switch display from the touch panel 14b, the CPU 11 determines that the operation instruction is inputted. Then, the CPU 11 reads event information through the scheduler program, the event information being linked with the image data of the note image displayed on the display panel 14a of the touch display unit 14, and displays the read event information as the event display screen 412 on the display panel 14a of the touch display unit 14.

Here, the CPU 11 functions as the display control unit to control such display.

Thus, a user can go back to the past schedules through the scheduler, find, for example, when this discussion was had or what the topic of the last month's regular meeting was, and read a note image of the time.

Modification

Next, an information processing apparatus 1A in accordance with a modification of the fourth embodiment is described with reference to FIG. 9. In the following, the components of the information processing apparatus 1A same as those of the information processing apparatus 1 of the fourth embodiment are denoted by the reference numbers same as those in the fourth embodiment, and detailed description thereof is omitted.

FIG. 9 shows a state in which the information processing apparatus 1A of the modification stands against the body cover 50, and the recording medium 40 is placed in front of the information processing apparatus 1A. In the modification, the recording medium 40 is composed of a plurality of pages in a form of a book, and handwritten notes of the recording medium 40 are photographed by the image pickup unit 15 at timings when pages of the recording medium 40 are turned (page-turning operation). The angle of view and the focus of the image pickup unit 15 are preset to be suitable for the recording medium 40 placed in such a way that the upper end of the recording medium 40 and the lower end of the information processing apparatus 1A are lined up.

The information processing apparatus 1A is the same as the information processing apparatus 1 of the fourth embodiment except for the information processing apparatus 1A not requiring the open-close angle sensor 20 and the binder 30. Hence, description of the components same as those of the information processing apparatus 1 is omitted by citing FIG. 3. In the following, the components, operations and the like characteristic of the modification are described.

In the information processing apparatus 1A of the modification, the CPU 11 makes the image pickup unit 15 photograph the recording medium 40 composed of a plurality of pages and obtains the current date and time from the timer unit 21 when the image pickup unit 15 finishes photographing (all the pages of) the recording medium 40 and obtains all the note images.

Alternatively, the CPU 11 may obtain the current date and time by recognizing through the OCR program a predetermined mark and date and time information recorded on the first page of the recording medium 40.

Further, instead of the time when the image pickup unit 15 finishes photographing the recording medium 40, the current date and time may be obtained when the image pickup unit 15 photographs the first page of the recording medium 40 (i.e., obtains the first note image).

Further, the predetermined mark may be recorded on any page of the recording medium 40 such as a page in the middle or the last page of the recording medium 40.

When an instruction to start a photographing mode is inputted by user operation onto the touch panel 14b, first, the CPU 11 takes in video image data obtained by the image pickup unit 15 continuously photographing (shooting) the recording medium 40 and analyzes the video image data to detect the page-turning operation by which pages of the recording medium 40 are turned.

It is assumed that the image data outputted from the image pickup unit 15 varying means that a page of the recording medium 40 is being turned to another page (the next page) thereof or user's finger is moving, namely, the page-turning operation is being performed. The CPU 11 keeps taking in the video image data obtained by the image pickup unit 15 continuously photographing the recording medium 40 and, when the image data does not vary, determines that the page-turning operation has been performed (completed).

The CPU 11 makes the image pickup unit 15 photograph the recording medium 40 to obtain image data of an image (still image) at the timing when detecting the page-turning operation on the recording medium 40.

The CPU 11 controls the image pickup unit 15 so that the handwritten note recorded on the recording medium 40 is photographed and stores the note image (still image) generated by the image pickup unit 15 in the RAM 17.

Next, the CPU 11 determines whether or not an instruction to end the photographing mode is inputted by user operation onto the touch panel 14b.

When determining that an instruction to end the photographing mode is not inputted, the CPU 11 keeps detecting the page-turning operation, and when detecting the page-turning operation, controls the image pickup unit 15 so that the handwritten note recorded on the recording medium 40 is photographed and stores the note image generated by the image pickup unit 15 in the RAM 17.

On the other hand, when determining that an instruction to end the photographing mode is inputted, the CPU 11 stops photographing the recording medium 40.

The method for linking and storing a plurality of note images with the event information (schedule information) in the storage unit 19 in the modification is the same as the handwritten note event linking process of the fourth embodiment.

As described above, the information processing apparatus 1 of the fourth embodiment includes: the image pickup unit 15 which photographs the recording medium 40 to obtain image data (note image); the scheduler as the management unit which performs schedule management by registering the event information including a date and time relevant to an event; the CPU 11 as the obtaining unit which obtains the linking date and time to link the image data with the event information registered in the scheduler; and the CPU 11 as the storage control unit which links and stores in the storage unit 19 the image data with the event information including the date and time corresponding to the linking date and time obtained by the CPU 11 as the obtaining unit.

Accordingly, when a handwritten note is photographed, its note image and a relevant event (schedule) in the scheduler can be linked with each other.

The information processing apparatus 1 of the fourth embodiment further includes: the binder 30 as the case including: the first cover 30*a* as the first case on which the recording medium 40 is disposed; and the second cover 30*b* as the second case provided with the body unit 10 and connected with the first cover 30*a* through the hinge part 30*c* so that the binder 30 is closeable; and the open-close angle sensor 20 which detects that the binder 30 is closed to a predetermined state. The image pickup unit 15 is disposed at a point of the body unit 10 so as to face the first cover 30*a* and obtains the image data at the timing when the open-close angle sensor 20 detects that the binder 30 is closed to the predetermined state.

Accordingly, a user does not need to perform an operation to register a handwritten note in the scheduler, and a note image based on the handwritten note can be automatically linked with a relevant event through an operation to close the binder 30.

The information processing apparatus 1 thereof further includes the timer unit 21 which measures a date and time. The CPU 11 as the obtaining unit obtains from the timer unit 21 the date and time at which the image data is obtained as the linking date and time.

Accordingly, by using the current date and time at which a handwritten note is photographed, when the current date and time corresponds to a registered date and time (registered event period) of an event in the scheduler, the handwritten note and the event can be linked with each other.

The information processing apparatus 1 thereof further includes the recognition unit which recognizes a date and time in the image data (note image). The obtaining unit obtains the date and time recognized by the recognition unit as the linking date and time.

Accordingly, when the date and time recorded on a handwritten note corresponds to a registered date and time (registered event period) of an event in the scheduler, its note image and the event can be linked with each other.

The information processing apparatus 1 thereof further includes: the display panel 14*a*; the touch panel 14*b* which receives user's operation instruction; and the CPU 11 as the display control unit which, (i) when user's operation instruction to switch display is inputted from the touch panel 14*b* in a state in which the event information registered in the scheduler is displayed on the display panel 14*a*, (a) reads the image data linked with the event information displayed on the display panel 14*a* from the storage unit 19 and (b) displays an image based on the read image data on the display panel 14*a*, and (ii) when user's operation instruction to switch display is inputted from the touch panel 14*b* in a state in which the image based on the image data stored in the storage unit 19 is displayed on the display panel 14*a*, (a) reads the event information linked with the image data of the image displayed on the display panel 14*a* from the scheduler and (b) displays the read event information on the display panel 14*a*.

Accordingly, from an event displayed by the scheduler, the relevant (linked) note image can be directly retrieved to be displayed, and also, from a displayed note image, the relevant (linked) event information can be directly retrieved to be displayed.

The present invention is not limited to the embodiments and modification described above, and various modifications can be appropriately made without departing from the scope of the present invention.

For example, if a handwritten note has a plurality of blocks, and, for example, the @ in a square and a date and time are recorded on each block, with respect to each block, the date and time can be recognized and an event can be linked with the recognized date and time.

Further, it is possible to manually photograph a handwritten note, manually select an event to which the handwritten note is linked and then manually link the handwritten note with the event.

What is claimed is:

1. An information processing apparatus comprising:
   a case including:
      a first case on which a recording medium is disposed; and
      a second case provided with a body unit and connected with the first case through a hinge part so that the case is closeable;
   a closing detection unit which detects that the case is closed to a predetermined state;
   a display unit which displays a first image;
   an image pickup unit which photographs the recording medium to generate a second image;
   a photography control unit which makes the image pickup unit photograph the recording medium at a predetermined timing; and
   a storage control unit which links and stores in a storage unit the second image generated by the image pickup unit with the first image displayed on the display unit at the predetermined timing, wherein
   the image pickup unit is disposed at a point of the body unit so as to face the first case, and
   the predetermined timing is a timing at which the closing detection unit detects that the case is closed to the predetermined state.

2. The information processing apparatus according to claim 1, wherein
   the recording medium includes a plurality of pages in a form of a book,
   the information processing apparatus further comprises a turning detection unit which detects a page-turning operation by which the pages of the recording medium are turned, and
   the predetermined timing is a timing at which the turning detection unit detects the page-turning operation.

3. The information processing apparatus according to claim 1 further comprising a switching detection unit which detects a switching instruction on the first image displayed on the display unit, wherein the predetermined timing is a timing at which the switching detection unit detects the switching instruction.

4. An information processing apparatus comprising:
a display unit which displays a first image;
an image pickup unit which photographs a recording medium to generate a second image;
a photography control unit which makes the image pickup unit photograph the recording medium at a predetermined timing;
a storage control unit which links and stores in a storage unit the second image generated by the image pickup unit with the first image displayed on the display unit at the predetermined timing;
an operation unit which receives a user operation instruction; and
a display control unit which, (i) when the user operation instruction to switch display is inputted from the operation unit in a state in which the first image stored in the storage unit is displayed on the display unit, (a) reads the second image linked with the first image displayed on the display unit from the storage unit and (b) displays the read second image on the display unit, and (ii) when the user operation instruction to switch display is inputted from the operation unit in a state in which the second image stored in the storage unit is displayed on the display unit, (a) reads the first image linked with the second image displayed on the display unit from the storage unit and (b) displays the read first image on the display unit.

5. A non-transitory computer readable medium in which a program to make a computer perform a procedure is stored, the procedure comprising:
displaying a first image on a display unit;
making an image pickup unit photograph a recording medium to generate a second image at a predetermined timing;
linking and storing in a storage unit the second image generated by the image pickup unit with the first image displayed on the display unit at the predetermined timing;
receiving a user operation instruction; and
controlling display such that, (i) when an instruction to switch display is received from the user operation instruction in a state in which the first image stored in the storage unit is displayed on the display unit, (a) reads the second image linked with the first image displayed on the display unit from the storage unit and (b) displays the read second image on the display unit, and (ii) when an instruction to switch display is received from the user operation instruction in a state in which the second image stored in the storage unit is displayed on the display unit, (a) reads the first image linked with the second image displayed on the display unit from the storage unit and (b) displays the read first image on the display unit.

6. An information processing apparatus comprising:
a case including:
a first case on which the recording medium is disposed; and
a second case provided with a body unit and connected with the first case through a hinge part so that the case is closeable;
a closing detection unit which detects that the case is closed to a predetermined state;
an image pickup unit which photographs the recording medium to obtain image data;
a management unit which performs schedule management by registering event information including a date and time relevant to an event;
an obtaining unit which obtains a linking date and time to link the image data with the event information registered in the management unit; and
a storage control unit which links and stores in a storage unit the image data with the event information including the date and time corresponding to the linking date and time obtained by the obtaining unit, wherein
the image pickup unit is disposed at a point of the body unit so as to face the first case and obtains the image data at a timing at which the closing detection unit detects that the case is closed to the predetermined state.

7. The information processing apparatus according to claim 6 further comprising a timer unit which measures a date and time, wherein
the obtaining unit obtains the date and time from the timer unit as the linking date and time, the date and time at which the image data is obtained.

8. The information processing apparatus according to claim 6 further comprising a recognition unit which recognizes a date and time in the image data, wherein
the obtaining unit obtains the date and time recognized by the recognition unit as the linking date and time.

9. An information processing apparatus comprising:
an image pickup unit which photographs a recording medium to obtain image data;
a management unit which performs schedule management by registering event information including a date and time relevant to an event;
an obtaining unit which obtains a linking date and time to link the image data with the event information registered in the management unit;
a storage control unit which links and stores in a storage unit the image data with the event information including the date and time corresponding to the linking date and time obtained by the obtaining unit;
a display unit;
an operation unit which receives a user operation instruction; and
a display control unit which, (i) when the user operation instruction to switch display is inputted from the operation unit in a state in which the event information registered in the management unit is displayed on the display unit, (a) reads the image data linked with the event information displayed on the display unit from the storage unit and (b) displays an image based on the read image data on the display unit, and (ii) when the user operation instruction to switch display is inputted from the operation unit in a state in which the image based on the image data stored in the storage unit is displayed on the display unit, (a) reads the event information linked with the image data of the image displayed on the display unit from the management unit and (b) displays the read event information on the display unit.

10. A non-transitory computer readable medium in which a program to make a computer perform a procedure is stored, the procedure comprising:
photographing a recording medium to obtain image data;
performing schedule management by registering event information including a date and time relevant to an event;

obtaining a linking date and time to link the image data with the event information;

linking and storing in a storage unit the image data with the event information including the date and time corresponding to the obtained linking date and time;

receiving a user operation instruction; and controlling display such that, (i) when an instruction to switch display is received from the user operation instruction in a state in which the event information registered in the management unit is displayed on the display unit, (a) reads the image data linked with the event information displayed on the display unit from the storage unit and (b) displays an image based on the read image data on the display unit, and (ii) when the instruction to switch display is received from the user operation instruction in a state in which the image based on the image data stored in the storage unit is displayed on the display unit, (a) reads the event information linked with the image data of the image displayed on the display unit from the management unit and (b) displays the read event information on the display unit.

\* \* \* \* \*